United States Patent
McFalls et al.

(10) Patent No.: US 7,114,590 B2
(45) Date of Patent: Oct. 3, 2006

(54) VEHICLE OCCUPANT PROTECTION SYSTEM INCLUDING A DEVICE FOR SENSING TENSION IN SEAT BELT WEBBING

(75) Inventors: Bob L. McFalls, Shelby Township, MI (US); Neal H. Delventhal, Lake Orion, MI (US); Keith R. Ball, Macomb Township, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 262 days.

(21) Appl. No.: 10/675,842

(22) Filed: Sep. 30, 2003

(65) Prior Publication Data

US 2005/0067826 A1 Mar. 31, 2005

(51) Int. Cl.
*B60R 22/30* (2006.01)
(52) U.S. Cl. ............................ 180/268; 280/805
(58) Field of Classification Search ............ 180/268; 280/801.1, 805; 340/457.1; 297/468
See application file for complete search history.

(56) References Cited

U.S. PATENT DOCUMENTS

| | | | | |
|---|---|---|---|---|
| 3,127,652 A * | 4/1964 | Springer | .................. | 24/165 |
| 3,294,444 A * | 12/1966 | Anderson | .................. | 297/468 |
| 3,351,381 A * | 11/1967 | Boblitz | .................. | 244/122 R |
| 3,440,602 A * | 4/1969 | Frig | .................. | 340/457.1 |
| 4,129,320 A * | 12/1978 | Fancy | .................. | 280/801.1 |
| 4,138,157 A * | 2/1979 | Pickett et al. | .................. | 297/472 |
| 4,150,843 A * | 4/1979 | Reid et al. | .................. | 280/801.1 |
| 4,169,615 A * | 10/1979 | Wize et al. | .................. | 280/801.1 |
| 4,799,709 A * | 1/1989 | Francois | .................. | 280/801.1 |
| 4,955,637 A * | 9/1990 | Huber et al. | .................. | 280/801.1 |
| 5,340,198 A * | 8/1994 | Murphy et al. | .................. | 297/483 |
| 5,472,234 A * | 12/1995 | Chang | .................. | 280/808 |
| 5,529,343 A * | 6/1996 | Klink | .................. | 280/805 |
| 5,547,223 A * | 8/1996 | Koketsu et al. | .................. | 280/805 |
| 5,624,135 A * | 4/1997 | Symonds | .................. | 280/801.1 |
| 5,996,421 A | 12/1999 | Husby | | |
| 6,081,759 A | 6/2000 | Husby et al. | | |
| 6,213,508 B1 * | 4/2001 | Cornell | .................. | 280/801.1 |
| 6,230,088 B1 | 5/2001 | Husby | | |
| 6,405,607 B1 | 6/2002 | Faigle et al. | | |
| 6,448,907 B1 * | 9/2002 | Naclerio | .................. | 340/945 |
| 6,454,304 B1 | 9/2002 | Steffens, Jr. | | |
| 6,572,148 B1 * | 6/2003 | Wittenberg | .................. | 280/808 |
| 6,581,968 B1 * | 6/2003 | Grace et al. | .................. | 280/801.1 |
| 6,594,571 B1 * | 7/2003 | Sakai et al. | .................. | 701/45 |
| 6,623,032 B1 * | 9/2003 | Curtis et al. | .................. | 280/735 |
| 6,729,428 B1 * | 5/2004 | Jitsui | .................. | 180/268 |
| 6,880,893 B1 * | 4/2005 | Scotton | .................. | 297/485 |
| 6,959,779 B1 * | 11/2005 | Curtis et al. | .................. | 180/268 |
| 7,032,929 B1 * | 4/2006 | Stanley et al. | .................. | 280/801.1 |
| 2002/0024205 A1 * | 2/2002 | Curtis et al. | .................. | 280/733 |
| 2002/0189879 A1 | 12/2002 | Jitsui | | |

* cited by examiner

*Primary Examiner*—Paul N. Dickson
*Assistant Examiner*—Barry Gooden, Jr.
(74) *Attorney, Agent, or Firm*—Tarolli, Sundheim, Covell & Tummino LLP

(57) ABSTRACT

A vehicle occupant protection system (10) includes seat belt webbing (18) and a device (64) coupled to the seat belt webbing (18) for sensing tension in the seat belt webbing (18). The device (64) is decoupled from the seat belt webbing (18) in response to the tension in the seat belt webbing (18) exceeding a predetermined threshold.

21 Claims, 3 Drawing Sheets

US 7,114,590 B2

VEHICLE OCCUPANT PROTECTION SYSTEM INCLUDING A DEVICE FOR SENSING TENSION IN SEAT BELT WEBBING

TECHNICAL FIELD

The present invention relates to a vehicle occupant protection system and, more particularly, to a vehicle occupant protection system that includes a device for sensing tension in seat belt webbing.

BACKGROUND OF THE INVENTION

There are various reasons for sensing tension in seat belt webbing. For example, it is common in a vehicle safety system to classify an occupant of a seat of a vehicle based upon a measured weight of the occupant on the seat. Protection devices of the vehicle safety system, such as an air bag or a pretensioner, are controlled based upon the occupant classification. For example, when the measured weight of the occupant on the seat is low, such as twenty pounds, the occupant classification may be a rear facing child seat. The vehicle safety system, upon the occurrence of a crash condition, may not actuate any protection devices for that vehicle seat in response to the classification of the occupant as a rear facing child seat. Accurate classification of the occupant of the seat is desirable for enhanced protection of the occupant during the occurrence of a crash condition.

The seat belt webbing may affect the measured weight of the occupant on the seat. For example, the seat belt webbing holding a rear facing child seat on the seat of a vehicle is generally locked in a position holding the rear facing child seat firmly against the seat. The downward force of the seat belt webbing on the rear facing child seat may increase the measured weight on the seat. As a result, a rear facing child seat may be incorrectly classified.

Determining the tension in the seat belt webbing enables the vehicle safety system to determine the weight attributable to the seat belt webbing so as to classify the occupant more accurately. Currently, tension sensors are sewn directly onto the seat belt webbing. If the tension sensor malfunctions or if the seat belt webbing becomes damaged, both the seat belt webbing and the tension sensor must be replaced.

SUMMARY OF THE INVENTION

The present invention relates to a vehicle occupant protection system comprising seat belt webbing and a device coupled to the seat belt webbing for sensing tension in the seat belt webbing. The device is decoupled from the seat belt webbing in response to the tension in the seat belt webbing exceeding a predetermined threshold. This minimizes the possible need to replace the tension sensor.

The present invention also relates to a vehicle occupant protection system. The vehicle occupant protection system comprises seat belt webbing and an anchor. The seat belt webbing is secured to the anchor. Tension in the seat belt webbing is transferred to the anchor. The vehicle occupant protection system further comprises a device for sensing tension in the seat belt webbing. The device includes first and second attachment portions and a sensor portion that is interposed between the first and second attachment portions. The first and second attachment portions of the device are secured to the seat belt webbing so that a portion of the seat belt webbing extends loosely between the first and second attachment portions. The device is subjected to the tension in the seat belt webbing. The sensor portion of the device senses the tension and provides a tension signal indicative of the sensed tension.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
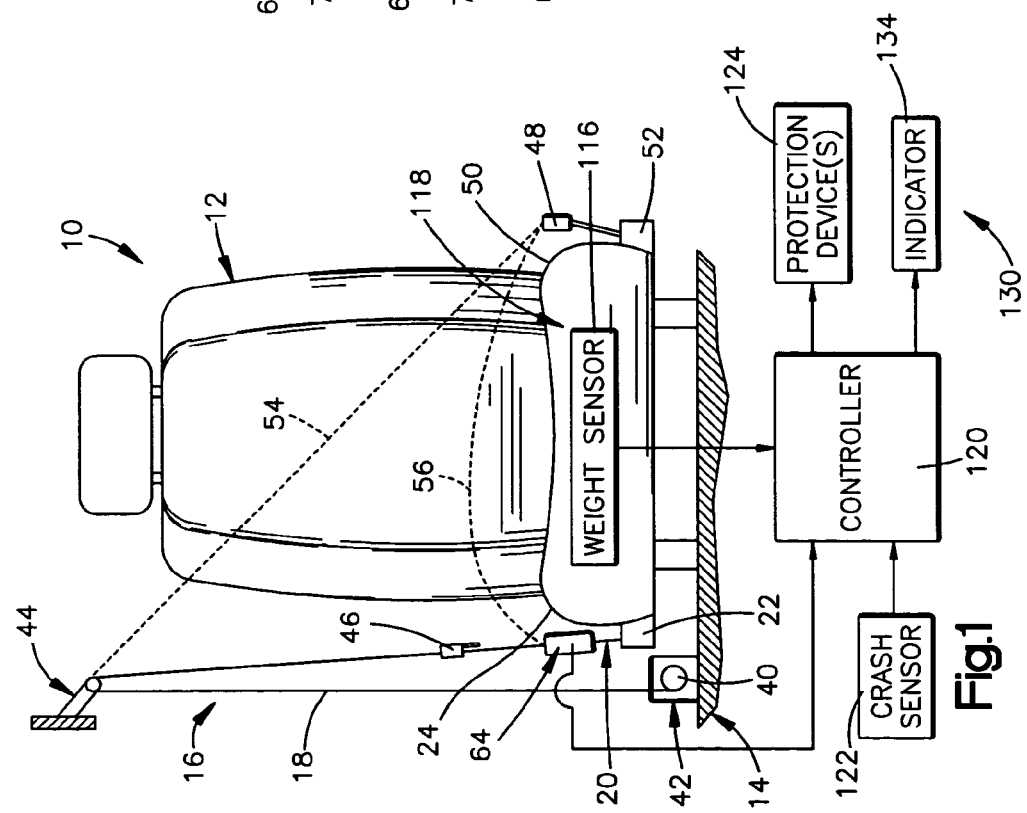
FIG. 1 is a schematic view of a vehicle occupant protection system constructed in accordance with the present invention.

FIG. 1 is a schematic view of a vehicle occupant protection system 10 constructed in accordance with the present invention. The vehicle occupant protection system 10 is associated with a seat 12 of a vehicle 14. The vehicle occupant protection system 10 includes a seat belt system 16. FIG. 1 illustrates a three-point seat belt system. The vehicle occupant protection system 10 may include an alternative seat belt system, such as a lap belt only system or a four-point seat belt system.

The seat belt system 16 helps to restrain an occupant (not shown) of the vehicle 14 in the seat 12. The seat belt system 16 includes a length of seat belt webbing 18 that is extensible about a seated occupant. A first end portion 20 of the seat belt webbing 18 is secured to an anchor 22 that is fixedly attached to a right side 24 of the seat 12. Alternatively, the anchor 22 may be fixedly attached to the vehicle 14 at a location adjacent the right side 24 of the seat 12.

A second end portion (not shown) of the seat belt webbing 18 is secured to a spool 40 (FIG. 1) of a seat belt retractor 42 that is located adjacent to the right side 24 of the seat 12. The seat belt retractor 42 includes a rewind spring (not shown) for winding a portion of the seat belt webbing 18 onto the spool 40. When a withdrawing force on the seat belt webbing 18 exceeds a winding force of the rewind spring, the spool 40 of the retractor 42 rotates to enable the seat belt webbing 18 to be withdrawn from the retractor. The retractor 42 also includes a locking mechanism (not shown) that is actuated upon the occurrence of a crash condition for preventing further withdrawal of the seat belt webbing 18 from the retractor.

The seat belt webbing 18 extends upwardly from the retractor 42, as shown in FIG. 1, and through a D-ring 44 that is secured to the vehicle 14. The seat belt webbing 18 extends from the D-ring 44 downwardly to the anchor 22. A tongue assembly 46 is attached to the seat belt webbing 18 in a location between the anchor 22 and the D-ring 44. The position of the tongue assembly 46 on the seat belt webbing 18 is adjustable.

A buckle assembly 48 for receiving the tongue assembly 46 is located on a left side 50 of the seat 12, as viewed by an occupant of the seat. The buckle assembly 48 is secured to an anchor 52 that is fixedly attached to a left side 50 of the seat 12. Alternatively, the anchor 52 may be fixedly attached to the vehicle 14 at a location adjacent the left side 50 of the seat 12.

To engage the seat belt system 16, the tongue assembly 46 is manually grasped and is pulled across the lap and torso of the occupant sitting in the seat 12. As the tongue assembly 46 is pulled across the lap and torso of the occupant, the tongue assembly 46 moves along the seat belt webbing 18 and the seat belt webbing is withdrawn from the retractor 42. When the seat belt webbing 18 has been pulled across the lap and torso of the occupant, the tongue assembly 46 is connected with a buckle assembly 48. When the seat belt system 16 is buckled, the seat belt webbing 18 is divided by the tongue assembly 46 into a torso portion 54, which extends across the torso of the occupant, and a lap portion 56, which extends across the lap of the occupant.

Figure 3:
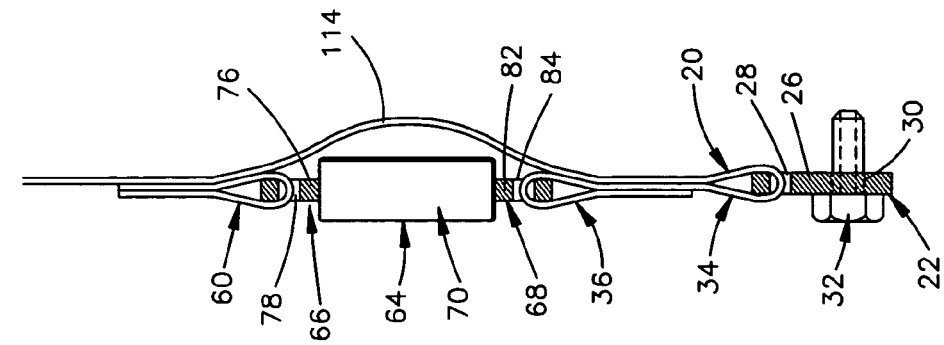
FIG. 3 is a view taken along lines 3—3 in FIG. 2.
Figure 2:
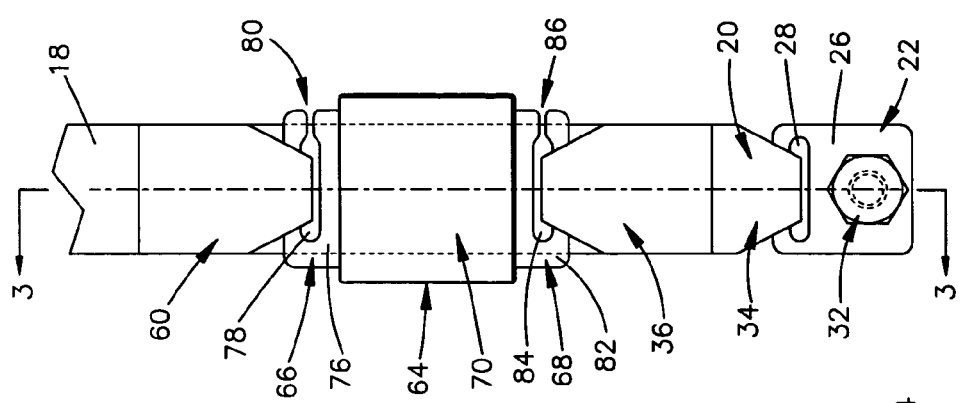
FIG. 2 is an enlarged view of a portion of the vehicle occupant protection system of FIG. 1.

As shown in FIGS. 2 and 3, the anchor 22 includes a metal plate 26 having a slot 28 and an aperture 30 (FIG. 3). A bolt 32 extends through the aperture 30 of the plate 26 to secure the plate to the seat 12. The first end portion 20 of the seat belt webbing 18 extends through the slot 28 of the plate 26 of the anchor 22 and is folded back upon itself so as to form a first loop 34 (FIG. 3) that extends through the slot 28. The first end portion 20 is again folded back upon itself so as to form a second loop 36 (FIG. 3) that is located immediately above, as viewed in FIG. 3, the first loop 34. The overlapping portions of the first end portion 20 of the seat belt webbing 18 are sewn together.

An upper loop 60 of material is attached to the seat belt webbing 18 in a location above, as viewed in FIG. 3, the second loop 36. The upper loop 60 is formed from a piece of material that is folded to have opposite ends overlying one another. The opposite ends of the material of the upper loop 60 are preferably sewn to the seat belt webbing 18 so that the upper loop extends downwardly, as viewed in FIG. 3, toward the second loop 36. The upper loop 60 is configured to tear when the tension in the seat belt webbing 18 exceeds a predetermined threshold. Preferably, the upper loop 60 is formed from a material that is designed to tear when the tension in the seat belt webbing 18 reaches approximately ninety pounds. For example, the upper loop 60 may be formed from a strip of polyester cloth having a thickness that provides the strip with a tear strength of approximately ninety pounds. The upper loop 60 is spaced above the second loop 36 by a first distance.

The vehicle occupant protection system 10 also includes a device 64 for measuring tension in the seat belt webbing 18. As is shown schematically in FIG. 1, the device 64 is attached to the seat belt webbing 18 in a location near the anchor 22. FIGS. 2 and 3 are enlarged views illustrating the device 64 attached to the seat belt webbing 18.

The device 64 includes first and second attachment portions 66 and 68, respectively, and a sensor portion 70 that is interposed between the first and second attachment portions. The first attachment portion 66 includes a planar metal plate 76 that extends upwardly, as shown in FIG. 2, from the sensor portion 70. An elongated slot 78 extends through the plate 76. An opening 80 (FIG. 2) leads to the slot 78.

The second attachment portion 68 is similar to the first attachment portion 66 and also includes a planar metal plate 82. The plate 82 of the second attachment portion 68 extends downwardly, as viewed in FIG. 2, from the sensor portion 70 of the device 64. An elongated slot 84 extends through the plate 82. An opening 86 (FIG. 2) leads to the slot 84. The slot 84 of the second attachment portion 68 is spaced away from the slot 78 of the first attachment portion 66 of the device 64 by a second distance. The second distance is shorter than the first distance, i.e., the distance between the upper loop 60 and the second loop 36 on the seat belt webbing 18.

Figure 4:
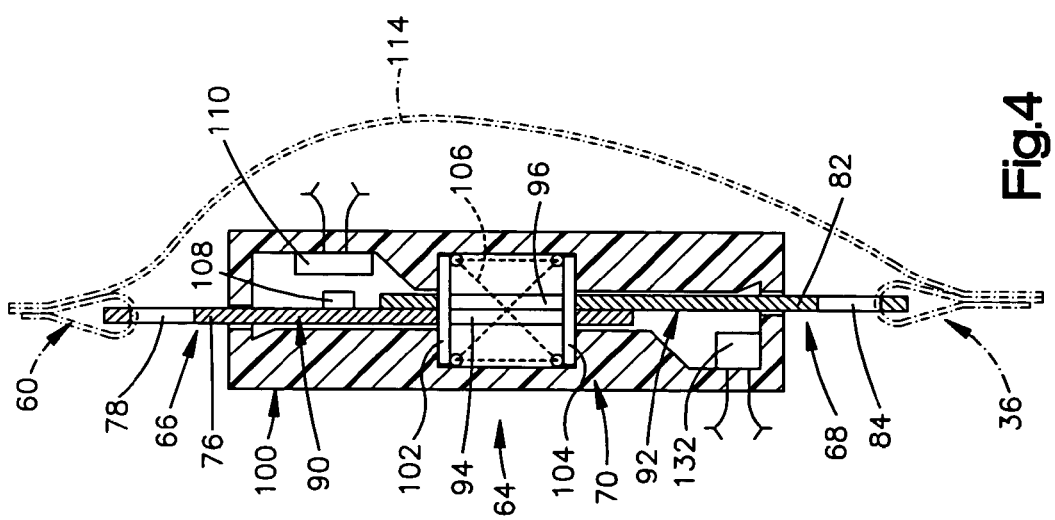
FIG. 4 is an enlarged cross-sectional view of a device of the vehicle occupant protection system of FIG. 1.

FIG. 4 is a cross-section of the device 64 illustrating an exemplary embodiment of the sensor portion 70 of the device. The sensor portion 70 of FIG. 4 includes first and second actuator members 90 and 92, respectively. The first actuator member 90 is made as one piece with the plate 76 of the first attachment member 66. An elongated slot 94 extends through the first actuator member 90. The second actuator member 92 is made as one piece with the plate 82 of the second attachment member 68. An elongated slot 96 extends through the second actuator member 92.

The first and second actuator members 90 and 92 are located in a housing 100 of the sensor portion 70. First and second plates 102 and 104, respectively, extend through the elongated slots 94 and 96 of the first and second actuator members 90 and 92, respectively. A spring 106 separates the first and second plates 102 and 104 and biases the first and second plates against the first and second actuator members 90 and 92. A magnet 108 is attached to the first actuator member 90 and a Hall effect sensor 110 is attached to the housing 100 near the magnet 108.

The device 64 is subjected to the tension in the seat belt webbing 18. Tension in the seat belt webbing 18 acts to pull the first actuator member 90 upwardly, as viewed in FIG. 4, and acts to pull the second actuator member 92 downwardly, as viewed in FIG. 4. As tension moves the first actuator member 90 upward and the second actuator member 92 downward, the first and second plates 102 and 104 are moved toward one another compressing the spring 106. The amount of movement of the first and second actuator members 90 and 92 is a function of the tension in the seat belt webbing 18. The Hall effect sensor 110 monitors movement of the magnet 108 with the first actuator member 90 and outputs a signal indicative of the sensed movement. Thus, the Hall effect sensor 110 senses tension in the seat belt webbing 18 and outputs a signal indicative of the sensed tension.

As an alternative to the sensor portion 70 described with regard to FIG. 4, the sensor portion 70 of the device 64 may have a known design. For example, the first and second attachment portions 66 and 68 may form opposite end portions of a single metal plate and a strain gauge may be located on the plate between the first and second attachment portions for measuring the tension in the seat belt webbing 18.

To attach the device 64 to the seat belt webbing 18, the upper loop 60 is maneuvered relative to the first attachment portion 66 so that the upper loop extends through the slot 78 in the first attachment portion of the device 64. The second loop 36 is maneuvered relative to the second attachment portion 68 so that the second loop extends through the slot 84 in the second attachment portion of the device 64.

Since the distance between the slots 78 and 84 of the first and second attachment portions 66 and 68 of the device 64, i.e., the second distance, is shorter than the distance between the upper loop 60 and the second loop 36 on the seat belt webbing 18, i.e., the first distance, a portion 114 (FIGS. 3 and 4) of the seat belt webbing 18 extends loosely between the first and second attachment members 66 and 68. The loosely extending portion 114 extends in parallel with the device 64. The device 64 is subjected to the tension in the seat belt webbing 18 that is being transferred to the anchor 22. The tension of the seat belt webbing 18 passes through the attached device 64 and bypasses the loosely extending portion 114 of the seat belt webbing 18. As a result, the loosely extending portion 114 of the seat belt webbing 18 is a non-load bearing portion of the seat belt webbing.

The vehicle occupant protection system 10 also includes a weight sensor 116 (FIG. 1). The weight sensor 116 is located in a cushion portion 118 of the seat 12 for sensing a weight that is applied to the seat. The weight sensor 116 outputs a weight signal indicating the sensed weight.

A controller 120 of the vehicle occupant protection system 10 is operatively connected to the sensor portion 70 of the device 64 and to the weight sensor 116. Preferably, the controller 120 is a microcomputer. The controller 120 receives the tension signal from the sensor portion 70 of the device 64 and the weight signal from the weight sensor 116. The controller 120, in response to the tension signal and the weight signal, determines a weight of the occupant on the seat 12, hereinafter referred to as the "calculated weight". In one example, the calculated weight is equal to the weight applied to the seat, i.e., the weight indicated by the weight signal, minus the tension in the seat belt webbing 18, i.e., the tension indicated by the tension signal.

The vehicle occupant protection system 10 also includes a crash sensor 122 for sensing a vehicle condition indicating the occurrence of a crash event. Such a condition may comprise, for example, vehicle deceleration. The crash sensor 122 is also operatively connected to the controller 120 and provides a crash signal indicative of the crash event to the controller.

The controller 120, in response to receiving the crash signal, determines whether actuation of one or more protection devices, indicated generally at 124 in FIG. 1, is desired. The protection devices 124 may include, but are not limited to, a front air bag, a side air bag, a rollover curtain, a knee bolster, an inflatable seat belt, and a pretensioner. The controller 120 is responsive to the calculated weight for determining whether actuation of the protection devices 124 is desirable. Preferably, the controller 120 includes a lookup table that correlates calculated weights to particular occupant classifications. Examples of some occupant classifications include, but are not limited to, rear facing child seat, child, and adult.

When the controller 120, for example, determines that the calculated weight indicates a rear facing child seat on the seat 12, the controller 120 may determine that actuation of the protection devices 124 is not desired. Conversely, when the controller 120 determines that the calculated weight indicates an adult, the controller 120 may determine that actuation of the protection devices 124 is desired. When actuation of the protection devices 124 is desired, the controller 120 outputs an actuation signal to the protection devices 124 to be actuated. The controller 120 may also use the calculated weight for controlling actuation of secondary stages of a multistage device, such as the second stage of a two-stage inflator.

Figure 6:
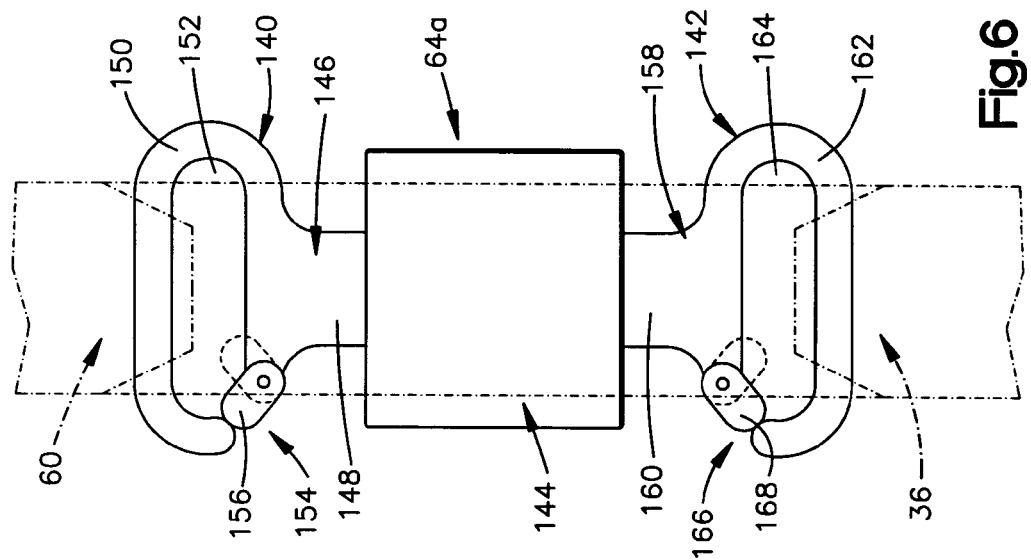
FIG. 6 is an enlarged view of an alternative device for the vehicle occupant protection system of FIG. 1.

When the seat belt system 16 acts to restrain the occupant of the seat 12 during the occurrence of a crash condition, the tension in the seat belt webbing 18 increases dramatically. When the tension in the seat belt webbing 18 exceeds the predetermined threshold, for example, approximately ninety pounds, the upper loop 60 tears to release the device 64 and the loosely extending portion 114 of the seat belt webbing 18 is pulled taut, as shown in FIG. 6. When the loosely extending portion 114 of the seat belt webbing is pulled taut, the loosely extending portion 114 becomes a load bearing portion of the seat belt webbing. Thus, during restraint of an occupant during the occurrence of a crash event, all of the tension in the seat belt webbing 18 is transferred directly from the seat belt webbing to the anchor 22.

Vehicle manufacturers typically specify a maximum amount of slack that a seat belt system may have prior to restraining an occupant during the occurrence of a crash condition. Since the loosely extending portion 114 of the seat belt webbing 18 of the present invention is pulled taut for restraining the occupant during the occurrence of a crash event, the amount of slack, i.e., the difference between the first and second distances, in the loosely extending portion 114 of the seat belt webbing 18 is chosen to be less than this specified maximum amount.

Releasing or decoupling of the device 64 from the seat belt webbing 18 during restraint of an occupant during the occurrence of a crash event has many advantages. Firstly, the device 64 does not need to be designed to handle the loads associated with occupant restraint during the crash event. As a result, the device 64 may be manufactured using lower strength components. Secondly, if, after restraining the occupant, the seat belt webbing 18 requires replacement, the device 64 may be used again with the replaced seat belt webbing. As a result, repair of the vehicle occupant protection system 10 is decreased.

Figure 5:
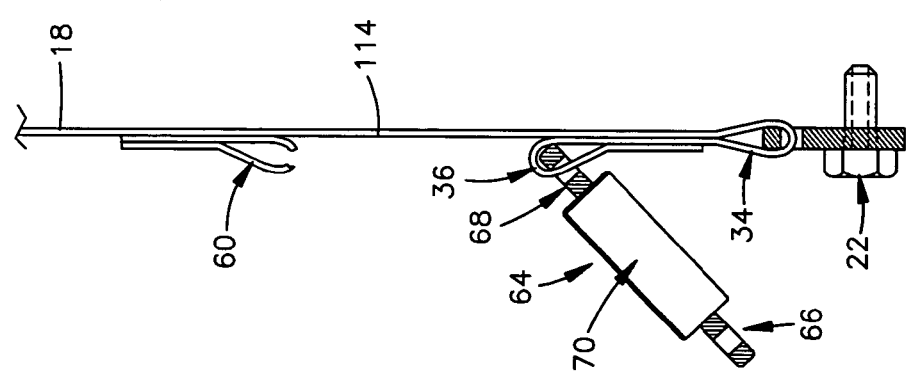
FIG. 5 schematically illustrates a portion of the vehicle occupant protection of FIG. 1 during restraint of an occupant during the occurrence of a crash condition.

The vehicle occupant protection system 10 of the present invention also includes an indicator system 130 (FIG. 1) for indicating to the vehicle operator that the device 64 has been released or decoupled from the seat belt webbing 18. The indicator system 130 includes a sensor 132 (FIG. 4) and an indicator 134 (FIG. 1). An exemplary indicator 134 includes a light located on an instrument panel of the vehicle 14. The sensor 132 of FIG. 4 is an orientation sensor or gravity sensor. The orientation sensor 132 is attached to the housing 100 of the sensor portion 70 of the device 64 and provides an orientation signal to the controller 120 when the housing 100 tilts by a predetermined angle relative to the direction of the earth's gravitational pull. For example, when the device 64 is positioned as viewed in FIG. 5, the orientation sensor 132 provides the controller 120 with the orientation signal. The controller 120, in response to receiving the orientation signal, determines that the device 64 has been released or decoupled from the seat belt webbing 18 and actuates the indicator 134.

In an alternative embodiment, the sensor 132 of the indicator system 130 may include a wire (not shown) that extends around the upper loop 60 and is connected to the controller 120. The wire has a low strength so as to break when the upper loop 60 is torn. During operation of the vehicle 14, a low voltage signal is sent through the wire to the controller 120. When the upper loop 60 tears to release the device 64, the low voltage signal to the controller 120 discontinues. In response to a discontinuation of the low voltage signal, the controller 120 determines that the device 64 has been released or decoupled from the seat belt webbing 18 and actuates the indicator 134.

FIG. 6 is an enlarged view of an alternative device 64a for the vehicle occupant protection system 10 of FIG. 1. The device 64a includes first and second attachment portions 140 and 142, respectively, and a sensor portion 144 that is interposed between the first and second attachment portions. The sensor portion 144 of the device 64a of FIG. 6 may be identical to the sensor portion 70 illustrated in FIG. 4 or may be a known sensor construction. Therefore, the sensor portion 144 of the device 64*a* of FIG. 6 is not discussed in detail.

The first attachment portion 140 includes a planar metal plate 146 that extends upwardly, as viewed in FIG. 6, from the sensor portion 144. The plate 146 includes a narrow portion 148 that extends outward of the sensor portion 144 and an ovate end portion 150. An elongated slot 152 extends through the end portion 150 of the plate 146. An opening 154 in the end portion 150 leads to the slot 152. A closure member 156 is pivotally attached to the end portion 150 of the plate 146 adjacent the opening 154. The closure member 156 is biased into a closed condition, shown by solid lines in FIG. 6, for closing the opening 154. The closure member 156 may be manually moved to an open condition, shown by dashed lines in FIG. 6.

The second attachment portion 142 is similar to the first attachment portion 140 and also includes a planar metal plate 158. The plate 158 of the second attachment portion 142 extends downwardly, as viewed in FIG. 6, from the sensor portion 144 of the device 64*a*. The plate 158 includes a narrow portion 160 that extends outward of the sensor portion 144 and an ovate end portion 162. An elongated slot 164 extends through the end portion 162 of the plate 158. The slot 164 of the second attachment portion 142 is spaced away from the slot 152 of the first attachment portion 140 of the device 64*a* by a second distance. The second distance is shorter than the first distance, i.e., the distance between the upper loop 60 and the second loop 36 on the seat belt webbing 18. An opening 166 in the end portion 162 leads to the slot 164. A closure member 168 is pivotally attached to the end portion 162 of the plate 158 adjacent the opening 166. The closure member 168 is biased into a closed condition, shown by solid lines in FIG. 6, for closing the opening 166. The closure member 168 may be manually moved to an open condition, shown by dashed lines in FIG. 6.

To attach the device 64*a* of FIG. 6 to the seat belt webbing 18, the closure member 156 of the first attachment portion 140 is moved into the open condition and the first attachment portion is moved relative to the upper loop 60 so that the upper loop extends through the slot 152 of the first attachment portion. The closure member 156 is then returned to the closed condition. Likewise, the closure member 168 of the second attachment portion 142 is moved into the open condition and the second attachment portion is moved relative to the second loop 36 so that the second loop extends through the slot 164 of the second attachment portion. The closure member 168 is then returned to the closed condition.

Figure 7:
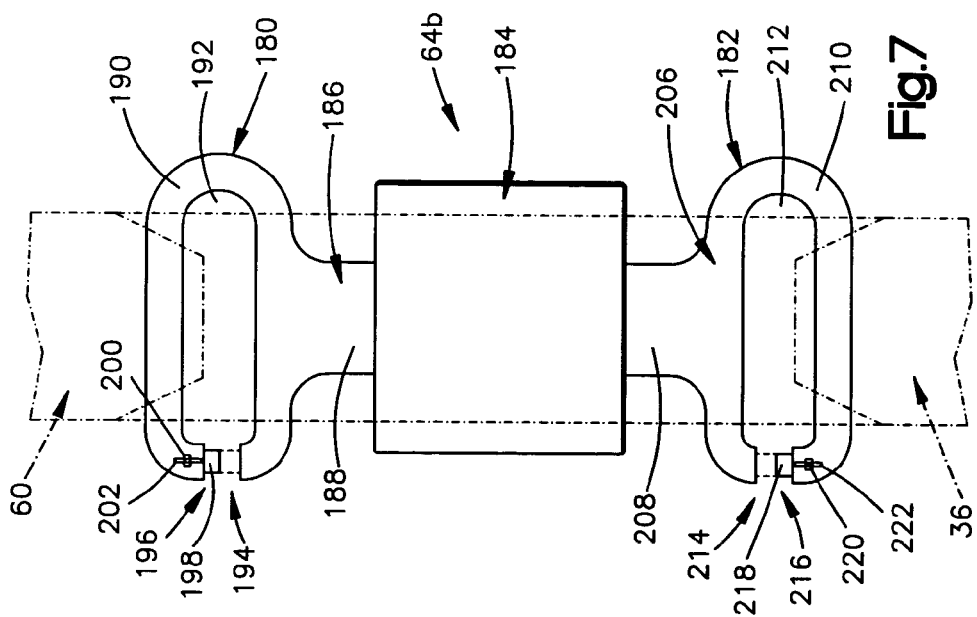
FIG. 7 is an enlarged view of a second alternative device for the vehicle occupant protection system of FIG. 1.

FIG. 7 is an enlarged view of a second alternative device 64*b* for the vehicle occupant protection system 10 of FIG. 1. The device 64*b* of FIG. 7 includes first and second attachment portions 180 and 182, respectively, and a sensor portion 184 that is interposed between the first and second attachment portions. The sensor portion 184 of the device 64*b* of FIG. 7 may be identical to the sensor portion 70 illustrated in FIG. 4 or may be a known sensor construction. Therefore, the sensor portion 184 of the device 64*b* of FIG. 7 is not discussed in detail.

The first attachment portion 180 of the device 64*b* includes a planar metal plate 186 that extends upwardly, as viewed in FIG. 7, from the sensor portion 184. The plate 186 includes a narrow portion 188 that extends outwardly of the sensor portion 184 and an ovate end portion 190. An elongated slot 192 extends through the end portion 190 of the plate 186. An opening 194 in the end portion 190 leads to the slot 192.

The first attachment portion 180 also includes a latch bolt mechanism 196. The latch bolt mechanism 196 includes a latch bolt 198, a biasing spring (not shown), and an actuator 200. The latch bolt mechanism 196 is located in a housing (not shown) that is fixedly attached to the plate 186 adjacent the opening 194 to the slot 192. The biasing spring is located within the housing and urges the latch bolt 198 downward, as viewed in FIG. 7, into a closed condition, shown by dashed lines in FIG. 7, for closing the opening 194 to the slot 192. The actuator 200 is fixed to the latch bolt 198 and extends through a slot 202 formed in the plate 186. The actuator 200 is manually movable upward, as viewed in FIG. 7, against the bias of the biasing spring to retract a portion of the latch bolt 198 into the housing. When a portion of the latch bolt 198 is retracted into the housing, as is shown by solid lines in FIG. 7, the latch bolt 198 is in an open condition enabling access to the slot 192 through the opening 194.

The second attachment portion 182 is similar to the first attachment portion 180 and also includes a planar metal plate 206. The plate 206 of the second attachment portion 182 extends downwardly, as viewed in FIG. 7, from the sensor portion 184 of the device 64*b*. The plate 206 includes a narrow portion 208 that extends outwardly of the sensor portion 184 and an ovate end portion 210. An elongated slot 212 extends through the end portion 210 of the plate 206. The slot 212 of the second attachment portion 182 is spaced away from the slot 192 of the first attachment portion 180 of the device by a second distance. The second distance is shorter than the first distance, i.e., the distance between the upper loop 60 and the second loop 36 on the seat belt webbing 18. An opening 214 in the end portion 210 leads to the slot 212.

The second attachment portion 182 also includes a latch bolt mechanism 216. The latch bolt mechanism 216 includes a latch bolt 218, a biasing spring (not shown), and an actuator 220. The latch bolt mechanism 216 is located in a housing (not shown) that is fixedly attached to the plate 206 adjacent opening 214 to the slot 212. The biasing spring is located within the housing and urges the latch bolt 218 upward, as viewed in FIG. 7, into a closed condition, shown by dashed lines in FIG. 7, for closing the opening 214 to the slot 212. The actuator 220 is fixed to the latch bolt 218 and extends through a slot 222 formed in the plate 206. The actuator 222 is manually movable downward, as viewed in FIG. 7, against the bias of the biasing spring to retract a portion of the latch bolt 218 into the housing. When a portion of the latch bolt 218 is retracted into the housing, as is shown by solid lines in FIG. 7, the latch bolt 218 is in an open condition enabling access to the slot 212 through the opening 214.

To attach the device 64*b* of FIG. 7 to the seat belt webbing 18, the latch bolt 198 of the first attachment portion 180 is moved into the open condition and the first attachment portion is moved relative to the upper loop 60 so that the upper loop extends through the slot 192 of the first attachment portion. The latch bolt 198 is then returned to the closed condition. Likewise, the latch bolt 218 of the second attachment portion 182 is moved into the open condition and the second attachment portion is moved relative to the second loop 36 so that the second loop extends through the slot 212 of the second attachment portion. The latch bolt 218 is then returned to the closed condition.

Figure 8:
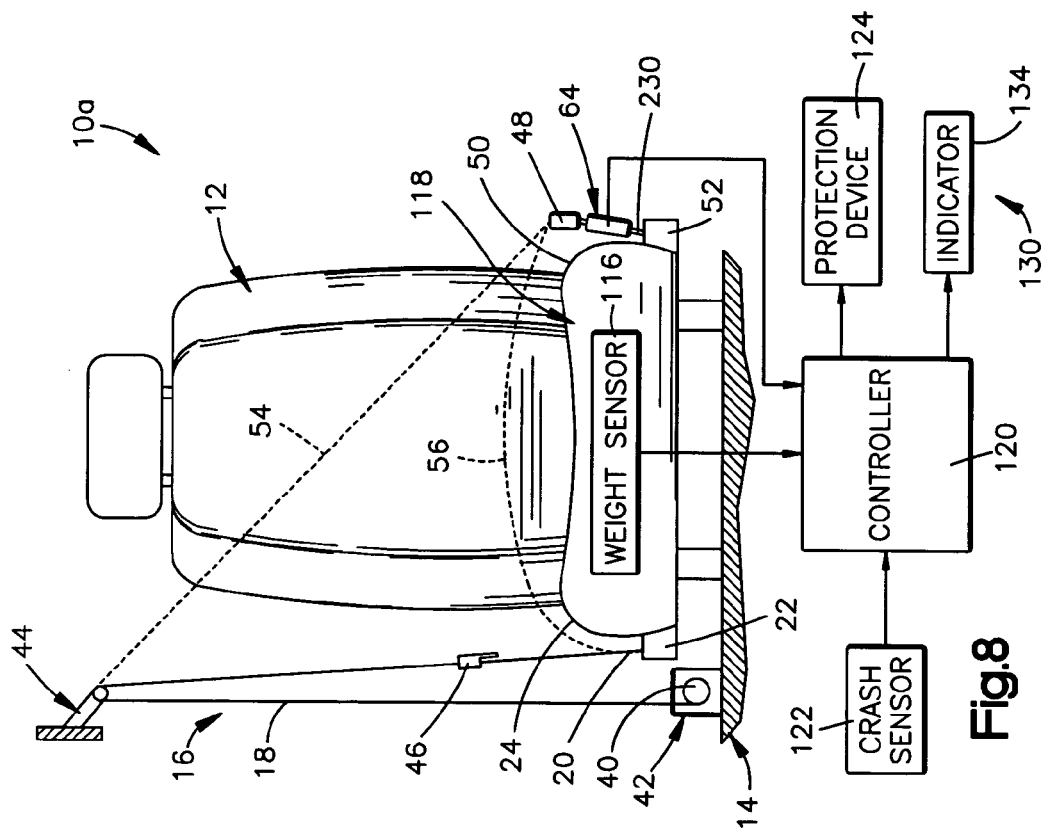
FIG. 8 is a schematic view of a vehicle occupant protection system constructed in accordance with a second embodiment of the present invention.

FIG. 8 is a schematic view of a vehicle occupant protection system 10*a* constructed in accordance with a second embodiment of the present invention. Structures of FIG. 8 that are the same or similar to structures of FIG. 1 are numbered using the same reference numbers.

The seat belt webbing 18 of the seat belt system 16 of the vehicle occupant protection system 10a of FIG. 8 is attached to the anchor 22 on the right side 24 of the seat 12. Buckle webbing 230 attaches the buckle assembly 48 to the anchor 52 on the left side 50 of the seat 12. The second loop 36 and the upper loop 60 are formed on the buckle webbing 230 and the device 64 is attached to the buckle webbing. The device 64 is attached to the buckle webbing 230 in a manner that is identical to attachment of the device 64 to the seat belt webbing 18 that is illustrated in FIGS. 2 and 3. The device 64 of FIG. 8 may alternatively include one of the devices 64a and 64b as shown and described with regard to FIGS. 6 and 7.

From the above description of the invention, those skilled in the art will perceive improvements, changes and modifications. For example, other mechanisms for closing the openings 80 and 86 to the slots 78 and 84, respectively, of the first and second attachment portions 66 and 68 of the device 64 may be used. Also, the device 64 may be attached to the seat belt webbing 18 using structures other than the loops 36 and 60. For example, a snap (not shown) or other fastener that is designed to open when the tension in the seat belt webbing 18 exceeds the predetermined threshold may be used to attach the device 64 to the seat belt webbing 18. Such improvements, changes and modifications within the skill of the art are intended to be covered by the appended claims.

Having described the invention, the following is claimed:

1. A vehicle occupant protection system comprising:
   seat belt webbing; and
   a device coupled to the seat belt webbing for sensing tension in the seat belt webbing, the device outputting an electronic signal indicative of the tension in the seat belt webbing to a controller, the controller determining whether to actuate a protection device, the device being decoupled from the seat belt webbing in response to the tension in the seat belt webbing exceeding a predetermined threshold.

2. The vehicle occupant protection system of claim 1 wherein a loosely extending portion of the seat belt webbing extends in parallel to the device, when the device is coupled to the seat belt webbing, so that the loosely extending portion of the seat belt webbing is a non-load bearing portion of the seat belt webbing.

3. The vehicle occupant protection system of claim 2 wherein the loosely extending portion of the seat belt webbing is pulled taut and becomes a load bearing portion of the seat belt webbing in response to decoupling of the device from the seat belt webbing.

4. The vehicle occupant protection system of claim 3 further including an indication system for indicating that the device has been decoupled from the seat belt webbing.

5. The vehicle occupant protection system of claim 4 wherein the indication system includes an orientation sensor that is connected to the device, the orientation sensor providing a signal when the device tilts by at least a predetermined angle.

6. The vehicle occupant protection system of claim 1 wherein the device has opposite first and second ends, the first and second ends of the device being attached to first and second members, respectively, for coupling the device to the seat belt webbing, the first member being configured to release the first end of the device in response to the tension in the seat belt webbing exceeding the predetermined threshold.

7. A vehicle occupant protection system comprising:
   seat belt webbing;
   a device coupled to the seat belt webbing for sensing tension in the seat belt webbing, the device being decoupled from the seat belt webbing in response to the tension in the seat belt webbing exceeding a predetermined threshold,
   the device having a loop of material configured to tear when the tension in the seat belt webbing exceeds the predetermined threshold.

8. A vehicle occupant protection system comprising:
   seat belt webbing;
   an anchor, the seat belt webbing being secured to the anchor, tension in the seat belt webbing being transferred to the anchor; and
   a device for sensing tension in the seat belt webbing, the device including first and second attachment portions and a sensor portion that is interposed between the first and second attachment portions,
   the first and second attachment portions of the device being secured to the seat belt webbing so that a portion of the seat belt webbing extends loosely between the first and second attachment portions, the device being subjected to the tension in the seat belt webbing, the sensor portion of the device sensing the tension and providing an electronic tension signal indicative of the sensed tension to a controller for determining whether to actuate a protection device.

9. The vehicle occupant protection system of claim 8 wherein the tension being transferred from the seat belt webbing to the anchor through the device bypasses the loosely extending portion of the seat belt webbing so that the loosely extending portion of the seat belt webbing is a non-load bearing portion of the seat belt webbing.

10. The vehicle occupant protection system of claim 9 wherein, upon the occurrence of a crash event, the first attachment portion of the device is released from the seat belt webbing and the loosely extending portion of the seat belt webbing becomes a load bearing portion of the seat belt webbing.

11. The vehicle occupant protection system of claim 10 further including an indication system for indicating that the first attachment portion of the device has been released from the seat belt webbing.

12. The vehicle occupant protection system of claim 11 wherein the indication system includes an orientation sensor that is connected to the device, the orientation sensor providing a signal when the device tilts by at least a predetermined angle.

13. The vehicle occupant protection system of claim 8 wherein the first and second attachment portions of the device include structure enabling the device to be releasably attached to the seat belt webbing.

14. The vehicle occupant protection system of claim 13 wherein the structure of the first attachment portion includes a first plate having a first slot with a first opening leading to the first slot and wherein the structure of the second attachment portion includes a second plate having a second slot with a second opening leading to the second slot.

15. The vehicle occupant protection system of claim 14 wherein the seat belt webbing includes first and second loops, the first and second loops being spaced apart from one another, the first slot of the first attachment portion receiving the first loop and the second slot of the second attachment portion receiving the second loop.

16. The vehicle occupant protection system of claim 15 wherein the first loop is configured to tear when tension in the seat belt webbing exceeds a predetermined threshold so as to release the first attachment portion of the device from the seat belt webbing, when the first attachment portion of the device is released from the seat belt webbing, the loosely extending portion of the seat belt webbing being pulled taut and becoming a load bearing portion of the seat belt webbing.

17. The vehicle occupant protection system of claim 15 wherein the first attachment portion of the device includes a first member, the first member having a closed condition for closing the first opening and an open condition for enabling insertion of the first loop into the first slot through the first opening, the second attachment portion of the device including a second member, the second member having a closed condition for closing the second opening and an open condition for enabling insertion of the second loop into the second slot through the second opening.

18. The vehicle occupant protection system of claim 17 wherein at least one of the first and second members is a pivotal closure member.

19. The vehicle occupant protection system of claim 17 wherein at least one of the first and second members is a latch bolt mechanism.

20. The vehicle occupant protection system of claim 8 further including a tongue assembly and a buckle assembly for releasably securing the tongue assembly, the tongue assembly being attached to the seat belt webbing.

21. The vehicle occupant protection system of claim 8 further including a tongue assembly and a buckle assembly for releasably securing the tongue assembly, the buckle assembly being attached to the seat belt webbing, the tongue assembly being attached to another length of webbing.

* * * * *